April 2, 1968 J. A. STEWART ET AL 3,376,568
TRANSISTOR SWITCHING CIRCUIT
Filed Sept. 29, 1964
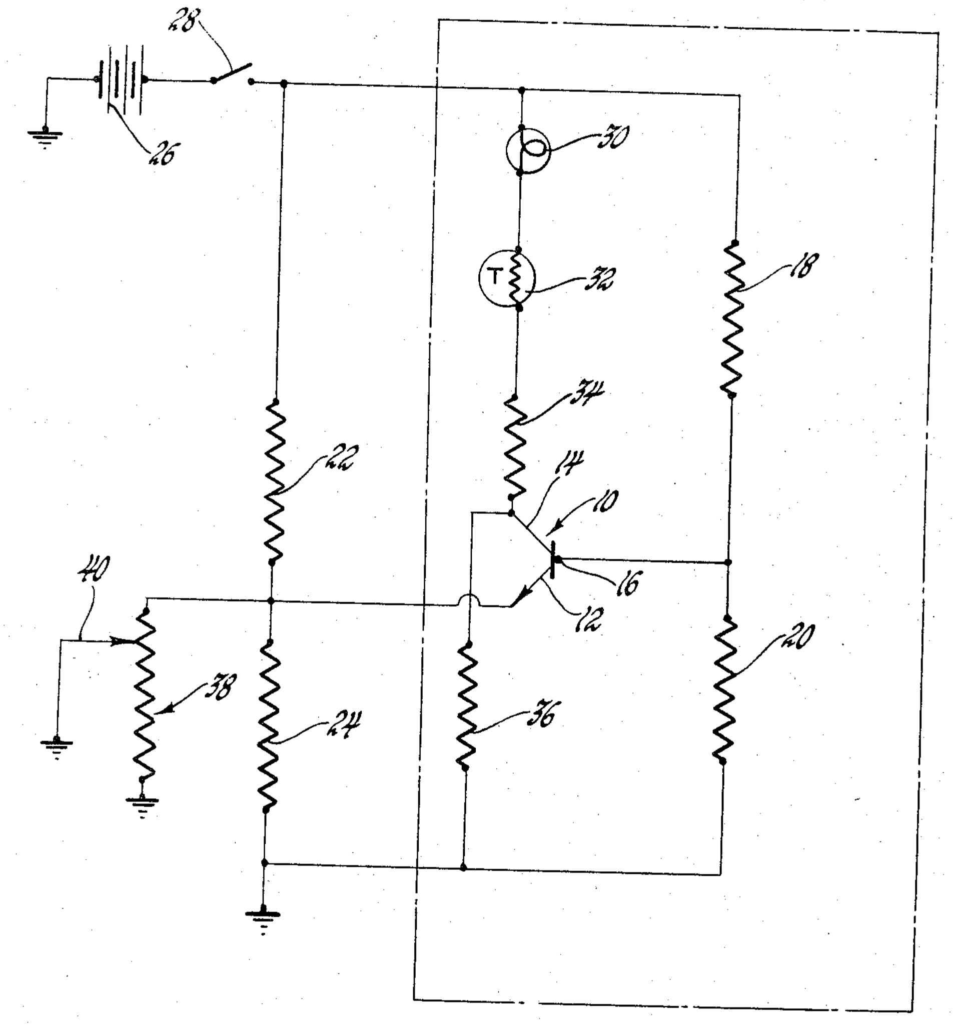
INVENTORS
John A. Stewart &
John R. Ziegler
Hugh L. Fisher
ATTORNEY

United States Patent Office 3,376,568

Patented Apr. 2, 1968

3,376,568

TRANSISTOR SWITCHING CIRCUIT

John A. Stewart and John R. Ziegler, Flint, Mich., assignors to General Motors Corporation, Detroit, Mich., a corporation of Delaware Filed Sept. 29, 1964, Ser. No. 400,041

8 Claims. (Cl. 340—244)

ABSTRACT OF THE DISCLOSURE

A transistor switching circuit for indicating the occurrence of a condition such as low fuel level in an automobile. In order to prevent excessive power dissipation in the transistor during the switching cycle a thermistor and a bleed resistor are connected in circuit with the transistor. The thermistor provides protection during the initial portion of the switching cycle and the bleed resistor removes a portion of the indicator lamp load from the transistor and also preheats the lamp filament to eliminate high inrush currents when the transistor switches.

This invention relates in general to transistor switching circuits and more particularly to a transistorized low fuel warning circuit.

The use of a transistor as a switching means offers a number of advantages over mechanical switches. There are no moving parts; they are easily activated from various electrical inputs; and the problems of contact bounce and arcing are essentially eliminated.

The possibility of destruction through operation in a region above the maximum power dissipation rating of the transistor is, however, an important limiting factor which must be considered in deciding upon the use of a particular transistor. This problem is even more acute where passage through the high dissipation region of the transistor may be relatively slow.

Where the switching action of the transistor is on the order of a few microseconds, peak dissipation of several times the transistor rating may be tolerated. However, where the transistor switching action is in response to a slowly varying parameter, such as for example, the fuel level in a motor vehicle fuel tank, it is apparent that transistor destruction through excessive power dissipation during the switching period is greatly enhanced.

In general the prior art approach to the solution of this problem has been to use a number of transistors connected in cascade to apportion the power handling requirement or to use a power transistor. Either approach represents increased costs in order to achieve the desired results.

The disadvantages associated with the prior art transistor switching circuits are obviated by the present invention. In accordance with a preferred embodiment of the invention a low fuel warning circuit is provided which is particularly adaptable for use in a motor vehicle and includes a switching transistor for connecting an indicating device across a source of power in response to a predetermined level of fuel in the vehicle gas tank. The switching of the transistor is controlled by the voltage appearing at the emitter electrode which is a function of the fuel level in the gas tank. The switching transistor utilized in the low fuel warning circuit of the present invention is a low power transistor which is relatively inexpensive.

In order to prevent excessive power dissipation in the transistor during switching, the indicating device is connected in series with a thermistor and a bleed resistor and the collector electrode of the transistor is connected to the junction of the thermistor and bleed resistor. With this arrangement, a portion of the normal load current bypasses the transistor through the bleed resistor and the thermistor functions to provide a time delay between the switching of the transistor and the passage of full load current therethrough.

A more complete understanding of the present invention may be had from the following detailed description which should be read in conjunction with the accompanying drawing which illustrates a preferred embodiment of the invention.

Referring now to the drawing, there is illustrated a low fuel warning circuit comprising a transistor generally designated 10 having emitter, collector, and base electrodes 12, 14 and 16, respectively. The base electrode 16 is connected to the junction of voltage dividing resistors 18 and 20 and the emitter electrode 12 is connected to the junction of the voltage dividing resistors 22 and 24 which may for example be the equivalent resistance of the "empty" and "full" coils of an air core fuel gauge. The resistors 18 and 20 and the resistors 22 and 24 are connected across the source 26 through an ignition switch 28 and provide reference voltages for the emitter and base electrodes of the transistor 10. Since both emitter and base reference voltages vary together the switching point of the transistor 10 is not affected by variation in the voltage of the source 26. A series circuit including an indicator lamp 30 a thermistor 32, a resistor 34, and a resistor 36 is connected across the source 26. The collector electrode 14 of the transistor 10 is connected to the junction of the resistors 34 and 36. A potentiometer 38 is connected to the emitter electrode 12 and includes a grounded wiper arm 40 which may be float-actuated. Thus, the resistance of the potentiometer 38 and therefore the voltage at the emitter 12 vary as a function of the level of the fuel in the vehicle gas tank.

With the resistance of the potentiometer 38 above a predetermined level indicating that the fuel in the vehicle tank is sufficient the voltage at the emitter 12 will be positive with respect to the reference voltage at the base 16 making the transistor 10 non-conductive. Current flows, however, through the series circuit of the lamp 30, thermistor 32 and the resistors 34 and 36. This current is insufficient to cause incandescence of the lamp 30 but is sufficient to keep the filament of the lamp 30 just below red heat.

As the fuel level of the tank is lowered, reducing the potentiometer resistance, a level will be reached where the voltage at the emitter of transistor 10 is lowered sufficiently to cause the transistor 10 to conduct. When the transistor 10 is saturated, the voltage across the potentiometer 38 will decrease to zero when the grounded float-actuated wiper 40 cuts out the resistance of the potentiometer 38.

The resistor 36 provides a parallel path with the transistor emitter-collector path for current flowing through the thermistor 32 and the resistor 34. Thus, the lamp inrush current which would normallly be carried by the transistor during switching is eliminated. Moreover, the current through the transistor 10 during the switching period is limited by the thermistor 32. Until the transistor 10 is fully saturated, the resistance of the thermistor 32 remains relatively high. As the transistor 10 turns on, more voltage is applied to the thermistor 32 which causes the thermistor 32 to self-heat, lowering the resistance thereof until at transistor saturation a steady state value is obtained which depends on ambient temperature, lamp current and supply voltage. The reduction in the resistance of the thermistor 32 allows the lamp 30 to light. The action of the thermistor 32 provides a time delay between switching of the transistor 10 and the passage of full load current therethrough so that only a small amount of power is dissipated in the transistor 10 during the switching interval.

If the transistor 10 is conducting indicating that the fuel level is low and sloshing of the fuel occurs with subsequent change in the resistance of the potentiometer 38, this would tend to cause the transistor 10 to switch off and on again before the thermistor 32 had returned to its high resistance state. The bleed resistor 36, however, protects the transistor 10 under these conditions.

The following table lists the circuit components and values thereof for a test circuit which was established in accordance with the schematic circuit diagram. This table is given by way of example only and not by way of limitation.

Transistor 10—npn GE AJX 168572, 200 mw.
Nominal imput voltage—14.4 volts DC
Resistor 18—550 ohms
Resistor 20—180 ohms
Resistor 22—45 ohms
Resistor 24—92 ohms
Lamps 30—6.3 volts, 150 ma.
Thermistor 32—high negative temperature coefficient resistor
Resistor 34—10 ohms
Resistor 36—150 ohms
Potentiometer 38—90 ohms In the foregoing example, the transistor 10 would start to conduct with the potentiometer resistance between 9 ohms and 16 ohms with the nominal conduction point at 12 ohms. The transistor would saturate with potentiometer resistance between 8.5 ohms and 5.5 ohms.

It will be apparent from the above that we have provided a novel transistorized indicator circuit including a single low power low cost transistor and associated protective circuitry whereby the possibility of transistor destruction during the switching period is greatly reduced.

While the invention has been described with regard to a preferred embodiment thereof, this should not be construed in a limiting sense. Modifications will now occur to those skilled in the art. For a definition of the invention, reference is made to the appended claims.

We claim:

1. A low fuel level warning circuit comprising a source of power, a transistor having emitter, collector, and base electrodes, first and second voltage dividing means connected across said source for establishing reference potentials at said base and emitter electrodes respectively, a fuel level responsive resistor connected to said emitter electrode for controlling the conduction of said transistor, a series circuit including an indicator lamp, a thermistor, a first resistor and a second resistor connected across said source, said collector electrode being connected to the junction between said first and second resistors.

2. A low fuel warning circuit comprising a source of DC voltage, a transistor having emitter, collector, and base electrodes, first and second voltage dividing resistors connected across said source, third and fourth voltage dividing resistors connected across said source, a series circuit including an indicator lamp, a thermistor, a fifth resistor, a sixth resistor connected across said source, a variable resistor responsive to fuel level connected in parallel with said second voltage dividing resistor, said emitter and base electrodes being connected respectively to the junction between said first and second voltage dividing resistors and said third and fourth voltage dividing resistors, said collector electrode being connected to the junction of said fifth and sixth resistors.

3. A low fuel warning circuit comprising a source of DC voltage, a series circuit connected across said source and including a low fuel warning lamp and a resistor, the resistance of said series circuit being such that the current flow therethrough is insufficient to cause incandescence of said lamp, but is sufficient to preheat the filament of said lamp, a transistor switch comprising emitter, collector and base electrodes, said collector electrode being connected to a junction between said lamp and said resistor, means establishing a reference voltage at said base electrode, means establishing a voltage at said emitter electrode which is variable in accordance with fuel level to control the switching of said transistor between cutoff and saturation.

4. The low fuel warning circuit defined by claim 3 further including a thermistor connected in said series circuit between said collector electrode and said warning lamp to provide a time delay between switching of said transistor and the passage of full load current through said transistor so that only a small amount of power is dissipated in the transistor during the switching interval.

5. The low fuel warning circuit defined in claim 3 wherein such transistor is of the NPN conductivity type.

6. A condition-responsive indicating circuit comprising a source of DC voltage, a series network connected across such source and including an indicator lamp, a thermistor, a current limiting resistor, and a bleed resistor, the resistance of said series network being such that the current flow therethrough is insufficient to cause incandescence of said lamp but is sufficient to preheat the filament of said lamp, a transistor having first, second and third electrodes, means establishing a reference voltage at said first electrode, condition-responsive means establishing a variable voltage at said second electrode to control the switching of said transistor, said third electrode being connected to a junction between said current limiting resistor and said bleed resistor.

7. A low fuel warning circuit comprising a source of DC voltage, a transistor having first, second and third electrodes, means establishing a reference voltage at said first electrode, means establishing a variable voltage at said second electrode to control the switching of said transistor as a function of fuel level, a series network connected across said source and comprising a warning lamp, a thermistor, a current limiting resistor, and a bleed resistor, said third electrode being connected to a junction between said current limiting resistor and said bleed resistor.

8. The circuit defined by claim 7 wherein said transistor is of the NPN conductivity type and said first, second and third electrodes correspond to the transistor's base, emitter and collector electrodes respectively.

References Cited

UNITED STATES PATENTS

| | | | |
|---|---|---|---|
| 2,828,450 | 3/1958 | Pinckaers. | |
| 3,240,989 | 3/1966 | Grunwaldt | 315—77 |
| 3,263,119 | 7/1966 | Scholl | 315—77 |
| 3,014,159 | 12/1961 | Frank | 317—148.5 X |
| 3,255,441 | 6/1966 | Goodwin et al. | 340—237 X |

FOREIGN PATENTS

| | | |
|---|---|---|
| 864,293 | 3/1961 | Great Britain. |

JOHN W. CALDWELL, *Primary Examiner.*

NEIL C. READ, THOMAS B. HABECKER, *Examiners.*

D. MYER, *Assistant Examiner.*